Feb. 5, 1957 W. C. JENNER ET AL 2,780,742
COIL STRUCTURE
Filed Oct. 24, 1952 2 Sheets-Sheet 1

INVENTORS
William C. Jenner
Robert S. Wick
BY Charles R. Newpher
Woodling and Krost
attys.

Feb. 5, 1957  W. C. JENNER ET AL  2,780,742
COIL STRUCTURE
Filed Oct. 24, 1952  2 Sheets-Sheet 2

INVENTORS
William C. Jenner
Robert S. Wick
Charles R. Newpher
BY
Woodling and Kroet,
attys.

United States Patent Office 2,780,742
Patented Feb. 5, 1957

2,780,742

COIL STRUCTURE

William C. Jenner, Robert S. Wick, and Charles R. Newpher, Cleveland, Ohio, assignors to The Reliance Electric and Engineering Company, a corporation of Ohio Application October 24, 1952, Serial No. 316,648

6 Claims. (Cl. 310—179)

The invention relates in general to an electrical coil structure, and more particularly to a coil structure using a thermosetting resin which fills the voids and interstices between the turns of the coil of wire and is cured or set into an integrated mass having no dead air spaces.

The invention is particularly applicable to a field coil for the frame of a dynamoelectric machine wherein the coil is a solid integrated mass which has a good thermal conductivity to the frame of the machine. Because of this good thermal conductivity, the heat produced in the coil by the passage of electrical current may be rapidly dissipated and as a result, the wattage input to the coil may be increased for the same temperature rise, which means that the physical size of the coil can be reduced, yet it will have the same magnetomotive force. This means that the physical size of the entire dynamo-electric machine may be reduced for a saving both of iron in the frame and copper in the coil.

The coil of this invention is a solid, integrated coil structure. It may be produced by any of a number of methods. A preferred method is that shown and described in the copending application entitled "Coil Making Method," filed May 27, 1952, Serial No. 290,244, and assigned to the same assignee, now Patent No. 2,713,715. In the preferred coil structure there is a bobbin which has a sleeve portion and two washer portions or bobbin ends. On this insulating bobbin a coil of wire is wound of one or more layers. Between the interstices of the wires, there is a thermosetting plastic. An outer covering is provided for protection of the wire coil, and this outer covering may be a plurality of laps of tape saturated with a thermosetting plastic. The entire coil structure is cured or hardened to present a coil structure which is a solid, integrated mass without any dead air spaces therein. This completed coil structure, in actual manufacture, has been found to ring like a bell when struck with a hard object.

An object of the invention is to provide a complete coil structure which has good heat conductivity to a metallic core of the coil.

Another object of the invention is to provide a coil structure which is a solid integrated mass without any dead air spaces therein.

Still another object of the invention is to provide a field coil for a dynamoelectric machine which can be smaller for the same magnetomotive force and the same temperature rise.

Yet another object of the invention is to provide a coil structure for a salient magnetic pole wherein the coil has a good heat conductivity to the metal core, achieved by a thermosetting resin filling the voids between the wires and the external insulation.

Other objects and a better understanding of the invention may be had by referring to the following description and claims taken in conjunction with the accompanying drawing, in which:

Figure 3:
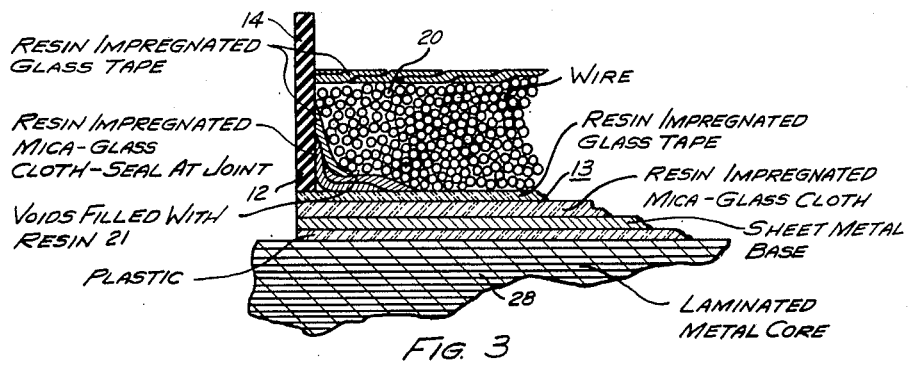
Figure 3 is an enlarged sectional view on the line 3—3 of Figure 2.
Figure 1:
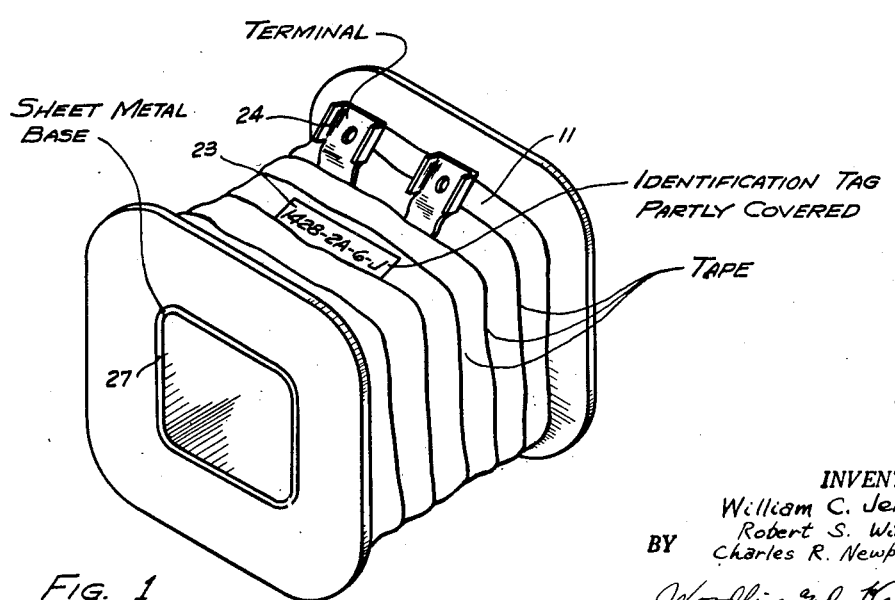
Figure 1 is an isometric view of a completed field coil.

The Figure 1 shows the completed coil structure 11; and the Figure 3, which is a partial sectional view, shows that this coil structure includes a spool or bobbin 12. The bobbin 12 includes generally a sleeve portion 13 and washers or bobbin ends 14. The sleeve portion 13 and the bobbin ends 14 are constructed of electric insulation material, or at least the winding surfaces of these elements are of an electric insulation material. The winding surfaces are defined as those surfaces on which the coil of wire is wound and would be the inner surfaces of the washers 14 and the outer peripheral surface of the sleeve portion 13.

Figure 4:
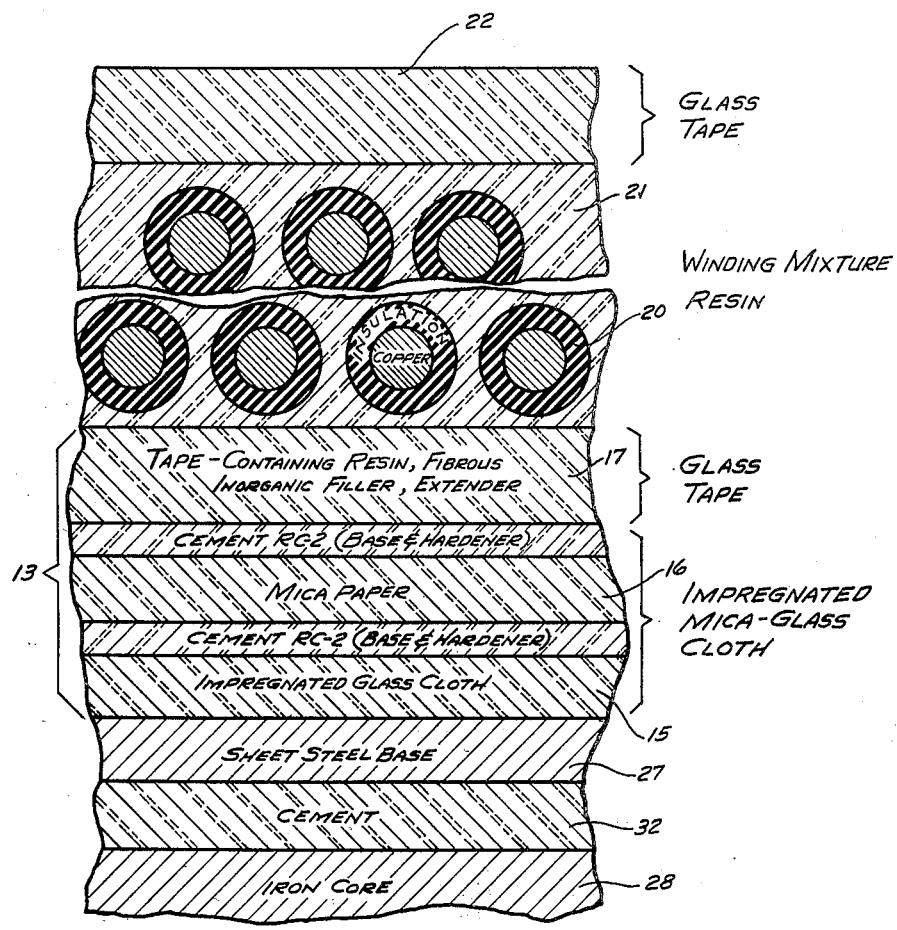
Figure 4 is a greatly enlarged sectional view similar to Figure 3.

The sleeve portion 13 is preferably constructed as shown in Figure 4, which shows that it includes impregnated glass cloth 15, mica paper 16, and impregnated glass tape 17. The glass cloth 15 is a form of a filler of inorganic fibers, in this case glass fibers which have been woven into a cloth or otherwise formed into a mat. The glass cloth is impregnated in some type of curable or hardenable resin. A thermosetting resin has been found preferable since this will not change its shape upon subsequent heating in the completed coil structure. Still further, an epoxy resin has been found quite suitable since it is a high temperature, high strength thermosetting resin which may be cured at as low as contact pressure. Further, it holds its shape at elevated temperatures of 150 to 200 degrees centigrade. Most important, this epoxy resin has no by-products from the reaction of curing. The resin would be applied to the glass cloth in a liquid form, and it has been found advantageous to use a resin extender which extends the resin so that the resin content of the entire mass can be kept to a minimum. A resin extender in powder form, which has been found to have good characteristics, is a metallic oxide; namely, sintered aluminum oxide. This has the desired characteristic of being a good electrical insulation; and yet, to some degree, the almost inconsistent property of having good thermal conductivity. The fillers and extenders reduce the shrinkage and the thermal coefficient of expansion.

The mica paper 16 has been included in the sleeve portion 13 in order to prevent the possible reduction in insulation breakdown resistance at elevated temperatures in the completed coil structure. The glass tape 17 is used to, in some measure, protect the mica paper 16 and to give a built up thickness to the entire sleeve portion 13. This glass tape is also impregnated with a thermosetting resin; and the glass tape 17, the mica paper 16, and the impregnated glass cloth 15 are all cemented together with a thermosetting resin. This entire sleeve portion 13, in the completed coil structure, is a solid which has a substantially complete lack of dead air spaces therein.

The washers 14 are preferably made from glass fibers pressed into a mat, impregnated with a thermosetting resin, and then pressed and cured into a sheet of solid insulation material. The washers 14 are joined to the sleeve portion 13 and united therewith to form the complete solid bobbin 12. At the joint between the washers 14 and sleeve portion 13, it has been found preferable to strengthen this joint by using some of the mica glass cloth 15—16 and covering it with the impregnated glass tape 17. This gives a rounded inside corner at the joint and materially strengthens this joint.

A coil of wire 20 is wound upon the bobbin 12; and this coil may, of course, comprise many turns and many layers. A thermosetting resin 21 preferably fills all the voids and interstices between the turns and layers of the wire in the coil 20. A protective cover 22 is provided for the coil 20; and this may conveniently consist of the glass tape 17 in a plurality of laps, as shown in Figure 1. An identification tag 23 and terminals 24 may be partially covered and fastened in by the protective cover 22.

Figure 2:
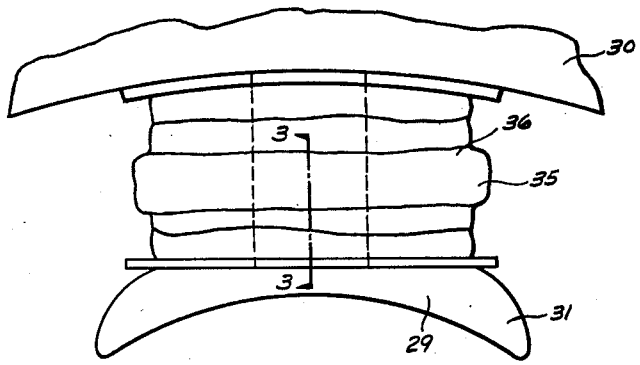
Figure 2 is a plan view of a completed field coil having an additional stabilizing coil thereon and mounted on the frame of a dynamoelectric machine.

In the assembly of this completed coil structure 11, especially in using a method similar to that described in the aforementioned application, the coil is wound on a winding machine, using a sheet steel sleeve 27 as a base. This sheet steel sleeve 27 is capable of being mounted upon the winding machine with the glass cloth 15 wound upon the sleeve 27 to cover it. Subsequent layers of the glass tape 17 and wire in the coil 20 may be applied and then the sheet steel sleeve 27 taken off the winding machine. An alternative construction would be one wherein the coil structure were wound directly upon an iron core 28. This iron core 28 could be the core portion of the field pole 29 of a dynamoelectric frame 30. In Figure 2 this frame 30 is shown as being a cylindrical or annular permeable structure. The field pole 29 also has a pole face portion 31. Where the coil is to be wound directly upon the core 28, using the core itself as a winding fixture on the winding machine, then it will be seen that the sheet steel sleeve 27 could be eliminated. Where the sleeve 27 is used, then as seen in Figure 4, a thermosetting resin cement 32 is used to cement the coil structure to the core 28.

The Figure 2 shows the completed coil structure as mounted on the field pole 29. In this drawing there is shown an additional winding 35. In constructing field poles for a dynamoelectric machine, many turns of relatively small wire are used for the shunt field winding of the machine. Additionally, a series field winding may be provided; and since this series field winding usually carries a large current, it is constructed of relatively few turns of large size wire. When such additional winding 35 is to be placed on the completed coil structure, it is usual to place additional insulation on top of the protective cover 22. This conveniently may be a layer of mica glass cloth 15—16 and a few laps of impregnated glass tape. The few turns of heavy wire for the winding 35 may then be added and covered with a thermosetting resin cement 36 which contains a fibrous inorganic filler. Asbestos has been found to be a good filler for this purpose. The additional winding 35 would likewise have terminals, not shown, for connection to the electrical circuit of the dynamoelectric machine.

All of the thermosetting resins used in the coil structure should be chemically compatible so that they may be cured into an integrated solid mass. Preferably, the various layers of cloth and tape are wound when they are in a flexible state and before the resin in this cloth or tape has been cured. It may be partially cured so that the tape and cloth become somewhat tacky upon subsequent heating which will aid the process of making the complete coil. After the complete coil has been constructed, then it may be heated to complete the curing and chemical reaction. This will make a completed coil structure 11 and transform it into the solid integrated mass desired. Certain parts of the coil structure 11 may be solids at the beginning of the assembly; for instance, the washers 14 and/or the sleeve portion 13.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A composite coil and core structure for a salient magnetic pole, said structure comprising a magnetically permeable core having first and second ends, a first insulating layer substantially covering the peripheral surface of said core between said ends, said first insulating layer being a strip of cloth woven from inorganic fibers and impregnated with a thermosetting plastic, said strip of cloth having a width approximately equal to the length of said core between the ends thereof, said first insulating layer also including a substantially continuous sheet of mica flakes, a second insulating layer covering said first insulating layer and being of a plurality of laps of tape woven from inorganic fiber and impregnated with a thermosetting plastic, said first and second insulating layers comprising an insulating sleeve, first and second spool ends near the ends of said core and joining with said insulating sleeve to form an insulating spool or bobbin, said spool ends having the surface thereof facing each other comprised of a thermosetting plastic, a coil of a plurality of layers of wire on said spool and having between the interstices thereof a thermosetting plastic, a third insulating layer similar to said second insulating layer and covering said coil between said spool ends, said insulating layers, spool ends, and coil being cured into a solid mass on said core with a substantially complete lack of dead air spaces in said mass to establish relatively good heat transfer from said coil to said core and to the exterior surface from the interior of said coil.

2. A coil structure comprising, a sleeve, an insulating bobbin on said sleeve, said bobbin including a sleeve portion and first and second bobbin ends, said sleeve portion including first and second insulating layers, said first insulating layer covering said sleeve, said first insulating layer being a strip of cloth woven from inorganic fibers and impregnated with a thermosetting plastic, said first insulating layer also including a substantially continuous layer of mica flakes, said strip of cloth having a width approximately equal to the length of said bobbin between the ends thereof, said second insulating layer covering said first insulating layer and being a plurality of laps of tape woven from inorganic fiber and impregnated with a thermosetting plastic, said bobbin ends having the surfaces thereof facing each other comprised of a thermosetting plastic, a coil of a plurality of layers of wire on said bobbin and having between the interstices thereof a thermosetting plastic, a third insulating layer similar to said second insulating layer and covering said coil between said bobbin ends, a second coil of relatively heavy wire on said third insulating layer, and a fibrous inorganic filler mixed with a thermosetting plastic covering said second coil, said insulating layers, bobbin ends, coils and sleeve being cured into a solid mass with a substantially complete lack of dead air spaces in said mass to establish relatively good heat transfer to the exterior surface from the interior of said coils.

3. A composite field coil and core structure for a salient pole of a field winding of a dynamoelectric machine, said pole having a laminated permeable core having a root end and a pole face end, said root end fastenable to an annular frame and said pole face end fastenable to a pole face, said composite structure comprising a first thermosetting plastic cement substantially covering the peripheral surface of said core between said ends, a sheet metal sleeve covering said cement, a first insulating layer covering said sheet metal sleeve, said first insulating layer being a strip of cloth woven from inorganic fibers and impregnated with a thermosetting plastic, said first insulating layer also including a substantially continuous layer of mica flakes, said strip of cloth having a width approximately equal to the length of said core between the ends thereof, a second insulating layer covering said first insulating layer and being a plurality of laps of tape woven from inorganic fiber and impregnated with a thermosetting plastic, said first and second insulating layers comprising an insulating sleeve, first and second spool ends near the ends of said core and joining with said insulating sleeve to form an insulating spool or bobbin, said spool ends having the surfaces thereof facing each other comprised of a thermosetting plastic, said first spool end adapted to lie adjacent said frame, one of said spool ends having a shape conforming to the adjacent permeable member in other than a single plane, a coil of a plurality of layers of wire on said spool and having between the interstices thereof a thermosetting plastic, a third insulating layer similar to said second insulating layer and covering said coil between said spool ends, a second coil of relatively heavy wire on said third insulating layer, and a fibrous inorganic filler mixed with a thermosetting plastic covering said second coil, all of said thermosetting plastics being compatible, said insulating layers, spool ends, coils, cement and sheet metal sleeve being cured into a solid mass on said core with a substantially complete lack of dead air spaces in said mass to establish relatively good heat transfer from said coils to said core and to the exterior surface from the interior of said coils.

4. A coil structure comprising a sleeve, an insulating bobbin on said sleeve, said bobbin including a sleeve portion and first and second bobbin ends, said sleeve portion including first and second insulating layers, said first insulating layer covering said sleeve, said first insulating layer being a strip of cloth woven from inorganic fibers and impregnated with a thermosetting plastic, said first insulating layer also including a substantially continuous layer of mica flakes, said strip of cloth having a width approximately equal to the length of said bobbin between the ends thereof, said second insulating layer covering said first insulating layer and being a plurality of laps of tape woven from inorganic fiber and impregnated with a thermosetting plastic, said bobbin ends having the surfaces thereof facing each other comprised of a thermosetting plastic, a coil of a plurality of layers of wire on said bobbin and having between the interstices thereof a thermosetting plastic, a third insulating layer similar to said second insulating layer and covering said coil between said bobbin ends, said insulating layers, bobbin ends, coil, and sleeve being cured into a solid mass with a substantially complete lack of dead air spaces in said mass to establish relatively good heat transfer to the exterior surface from the interior of said coil.

5. A composite coil and core structure comprising a magnetically permeable core having two ends, a first thermosetting plastic cement substantially covering the peripheral surface of said core between said ends, a sheet metal sleeve covering said cement, a first insulating layer covering said sheet metal sleeve, said first insulating layer being a strip of cloth woven from inorganic fibers and impregnated with a thermosetting plastic, said first insulating layer also including a substantially continuous layer of mica flakes, said strip of cloth having a width approximately equal to the length of said core between the ends thereof, a second insulating layer covering said first insulating layer and being a plurality of laps of tape woven from inorganic fiber and impregnated with a thermosetting plastic, said first and second insulating layers comprising an insulating sleeve, first and second spool ends near the ends of said core and joining with said insulating sleeve to form an insulating spool or bobbin, said spool ends having the surfaces thereof facing each other comprised of a thermosetting plastic, a coil of a plurality of layers of wire on said spool and having between the interstices thereof a thermosetting plastic, a third insulating layer similar to said second insulating layer and covering said coil between said spool ends, all of said thermosetting plastics being compatible, said insulating layers, spool ends, coil, cement and sheet metal sleeve being cured into a solid mass on said core with a substantially complete lack of dead air spaces in said mass to establish relatively good heat transfer from said coil to said core and to the exterior surface from the interior of said coil.

6. A composite coil and core structure comprising a magnetically permeable core having two ends, a first thermosetting plastic cement substantially covering the peripheral surface of said core between said ends, a sheet metal sleeve covering said cement, a first insulating layer covering said sheet metal sleeve, said first insulating layer being a strip of cloth woven from inorganic fibers and impregnated with a thermosetting plastic, said first insulating layer also including a substantially continuous layer of mica flakes, said strip of cloth having a width approximately equal to the length of said core between the ends thereof, a second insulating layer covering said first insulating layer and being a plurality of laps of tape woven from inorganic fiber and impregnated with a thermosetting plastic, said first and second insulating layers comprising an insulating sleeve, first and second spool ends near the ends of said core and joining with said insulating sleeve to form an insulating spool or bobbin, said spool ends having the surfaces thereof facing each other comprised of a thermosetting plastic, a coil of a plurality of layers of wire on said spool and having between the interstices thereof a thermosetting plastic, a third insulating layer similar to said second insulating layer and covering said coil between said spool ends, a second coil of relatively heavy wire on said third insulating layer, and a fibrous inorganic filler mixed with a thermosetting plastic covering said second coil, all of said thermosetting plastics being compatible, said insulating layers, spool ends, coils, cement and sheet metal sleeve being cured into a solid mass on said core with a substantially complete lack of dead air spaces in said mass to establish relatively good heat transfer from said coils to said core and to the exterior surface from the interior of said coils.

References Cited in the file of this patent

UNITED STATES PATENTS

| | | |
|---|---|---|
| 961,805 | Scott | June 21, 1910 |
| 1,998,827 | Worrell et al. | Apr. 23, 1935 |
| 2,266,925 | Verrill | Dec. 23, 1941 |
| 2,473,842 | Askey | June 21, 1949 |
| 2,549,309 | Hill et al. | Apr. 17, 1951 |
| 2,640,102 | Woods Jr., et al. | May 26, 1953 |